United States Patent [19]

Fukuo

[11] Patent Number: 4,909,203
[45] Date of Patent: Mar. 20, 1990

[54] OIL RESERVOIR STRUCTURE FOR ENGINE

[75] Inventor: Koichi Fukuo, Saitama, Japan

[73] Assignee: Honda Giken KDGYO Kabushiki Kaisha, Tokyo, Japan

[21] Appl. No.: 342,973

[22] Filed: Apr. 25, 1989

[30] Foreign Application Priority Data

Apr. 26, 1988 [JP] Japan ................. 63-103122
Apr. 26, 1988 [JP] Japan ................. 63-103123

[51] Int. Cl.⁴ ............................................. F01M 1/00
[52] U.S. Cl. ........................... 123/196 R; 184/106; 184/6.5
[58] Field of Search ............ 123/196 R; 184/6.5, 184/106

[56] References Cited

U.S. PATENT DOCUMENTS

| | | | |
|---|---|---|---|
| 3,100,028 | 8/1963 | Booth et al. | 184/106 |
| 3,101,129 | 8/1963 | Hulten | 184/106 |
| 3,106,263 | 10/1963 | McKellar | 184/106 |
| 3,653,464 | 4/1972 | Jacobsen et al. | 184/106 |
| 4,134,380 | 1/1979 | Niwa et al. | 184/6.5 |
| 4,296,716 | 10/1981 | Hofbauer et al. | 123/196 AB |

FOREIGN PATENT DOCUMENTS

62-124208 7/1987 Japan.

Primary Examiner—E. Rollins Cross
Attorney, Agent, or Firm—Lyon & Lyon

[57] ABSTRACT

An oil reservoir structure for an engine having an oil reservoir chamber attached to the lower end of the cylinder block of the engine. A volume body having a predetermined volume is located in the space defined between the crankshaft of the engine and the normal oil level in the oil reservoir chamber. The volume body becomes submerged upon tilting of the oil level, such as in vehicle turning, acceleration, deceleration or on inclines, to displace a volume of oil to raise the oil level and maintain the oil level above the oil strainer inlet leading to the oil pump. The volume body may be fixedly mounted or disposed on the oil level and vertically movable in response to a change in the oil level.

10 Claims, 7 Drawing Sheets

OIL RESERVOIR STRUCTURE FOR ENGINE

The present invention relates to an oil reservoir structure for an engine which can draw sufficient oil from the inlet of an oil strainer even when the oil in the oil reservoir chamber is displaced to one side while the motor vehicle is making a turn or being accelerated or decelerated.

Generally, while a motor vehicle is making a turn or being accelerated or decelerated, oil in the engine oil reservoir chamber is displaced to one side to lower the oil level at the inlet of the oil strainer. Therefore, air tends to be drawn through the inlet of the oil strainer, thus failing to supply sufficient oil to various parts of the engine which are to be lubricated.

One prior art arrangement devised to eliminate the above problem is an oil pan for an engine as disclosed in Japanese Laid-Open Patent Publication No. 62-124208, for example. The disclosed oil pan has a bulging portion projecting from a side wall into the oil pan at a position which is a predetermined dimension higher than an upper oil level limit on the side wall. When oil in the oil pan is displaced to one side while the motor vehicle is making a turn or being accelerated or decelerated, the bulging portion becomes partly submerged below the oil level, thereby raising the oil level by a height that is commensurate with the volume of the submerged portion of the bulging portion. The oil level at the inlet of the oil strainer is also raised to allow sufficient oil to be drawn from the inlet of the oil strainer.

With the prior art arrangement, however, since the bulging portion for elevating the oil level is formed along an inner wall surface of the oil pan, it cannot sufficiently raise the oil level when the oil level is greatly tilted with respect to the oil pan. Moreover, the conventional structure requires a complex manufacturing process since the bulging portion must be fixed as by welding to the inner wall surface of the oil pan.

It is an object of the present invention to provide an oil reservoir structure for an engine, which can sufficiently raise the oil level even when the oil level is greatly tilted and which can be manufactured simply.

To achieve the above object, an oil reservoir structure for an engine according to the present invention, having an oil reservoir chamber or pan attached to the lower end of the cylinder block of the engine, includes a volume body having a predetermined volume and located in a space defined between the crankshaft of the engine and the oil level in the oil reservoir chamber. In one embodiment, the volume body is fixedly disposed in the oil reservoir chamber. In another embodiment, the volume body is normally disposed on the oil level and is vertically movable in response to changes in the oil level with limiting means for limiting upward movement of the volume body.

The volume body preferably doubles as a baffle plate disposed outwardly of a path along which said crankshaft is rotatable and covering a substantially entire oil surface in the oil reservoir chamber. The volume body is preferably of a hollow construction. Alternatively, the volume body may be of a solid construction.

When oil in the oil reservoir chamber is displaced to one side while the motor vehicle is making a turn or being accelerated or decelerated, a portion of the volume body having a predetermined volume located in the space between the crankshaft and the oil level is submerged below the oil level. The oil level is increased by a height that is commensurate with the volume of the submerged portion of the volume body below the oil level, and hence the oil level at the inlet of the oil strainer is also increased.

For the embodiment having limiting means for limiting upward movement of the volume body, the limiting means preferably includes a damper mechanism for limiting the speed of upward movement of the volume body. Alternatively, the limiting means preferably comprises a sensor for detecting when the motor vehicle makes a turn or is accelerated or decelerated, and a damper mechanism for stopping upward movement of the volume body or limiting the speed of upward movement of the volume body in response to the detected signal from the sensor, whereby a portion of the volume body is submerged below the oil level to increase the height of the oil level commensurate with the volume of the submerged portion of the volume body below the oil level.

Figure 1:
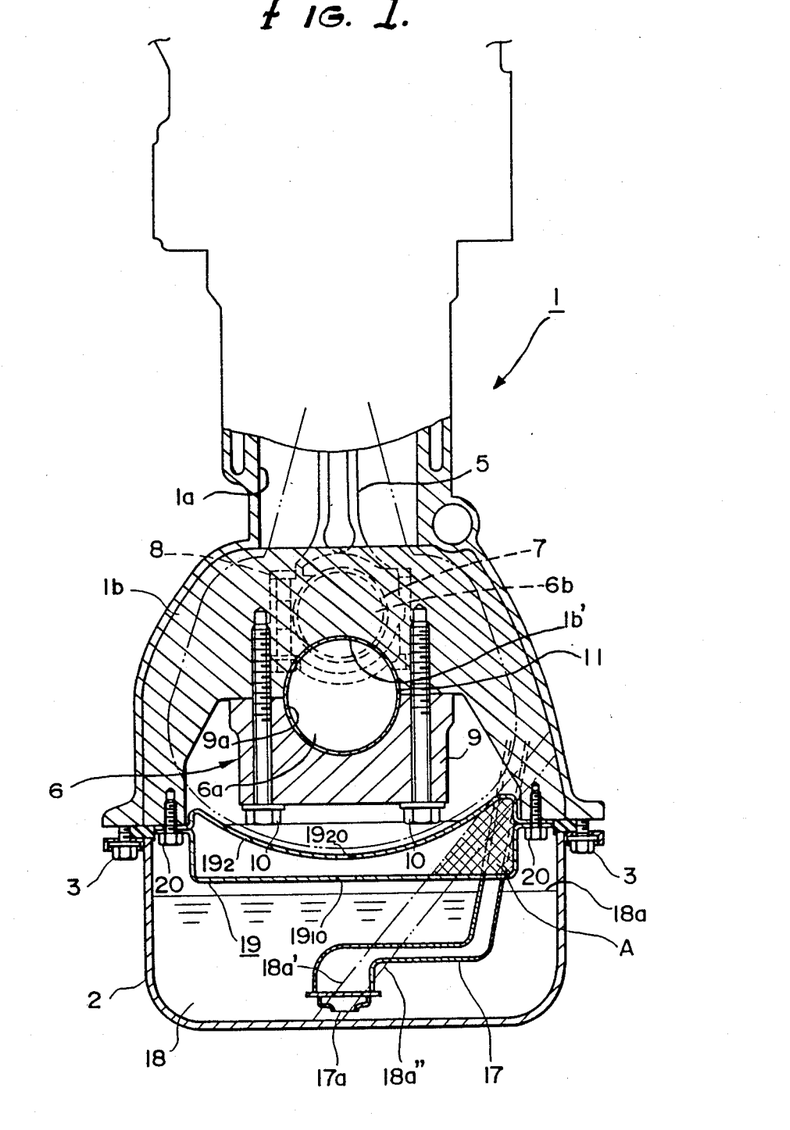
FIG. 1 is a vertical cross-sectional end view of an oil reservoir chamber in an engine for a motor vehicle, taken along a plane perpendicular to the axis of a crankshaft, showing a first embodiment of the present invention.
Figure 2:
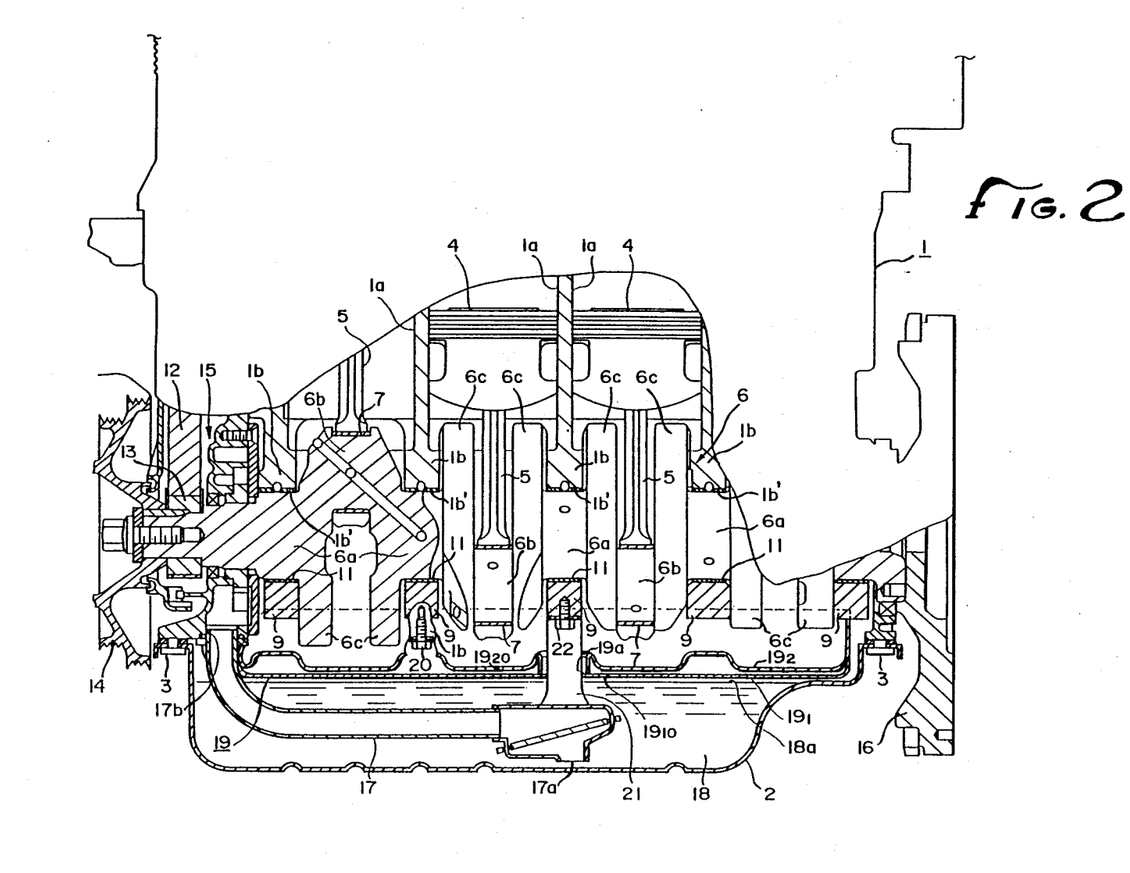
FIG. 2 is a vertical cross-sectional side view of the oil reservoir chamber of FIG. 1 taken along a plane including the axis of the crankshaft.

The preferred embodiments of the present invention will hereinafter be described with reference to the drawings, wherein:

FIGS. 1 and 2 show a first embodiment in which the present invention is applied to an oil reservoir chamber for a four-cylinder engine.

As shown in FIGS. 1 and 2, an oil reservoir chamber 2, commonly referred to as an oil pan, is fastened to the lower end of a cylinder block 1 of the engine by means of bolts 3. The cylinder block 1 accommodates therein pistons 4 reciprocally fitted in respective cylinder bores 1a, connecting rods 5 having smaller-diameter ends connected respectively to the pistons 4, and a crankshaft 6 which is rotatable about its own axis by reciprocating movement of the pistons 4 that is transmitted through the connecting rods 5.

The crankshaft 6 comprises main shafts 6a rotatably supported in the cylinder block 1, crankpins 6b to which larger-diameter ends of the connecting rods 5 are connected through bearings 7 by means of bolts 8, and crank arms 6c interconnecting the main shafts 6a and the crankpins 6b, the crank arms 6c doubling as counterweights. Each of the main shafts 6a is rotatably supported by a bearing 11 between a semicircular bearing surface 1b' of a skirt 1b of the cylinder block 1 and a semicircular bearing surface 9a of a bearing cap 9 which is fastened to the lower end of the skirt 1b by means of bolts 10.

To one end of the crankshaft 6, there are coupled a drive pulley 13 meshing with a timing belt 12, a crankshaft pulley 14, and an oil pump 15 which is directly drivable by the crankshaft 6. The other end of the crankshaft 6 is coupled to a flywheel 16.

An oil strainer 17 is disposed in the oil reservoir chamber 2. The oil strainer 17 has an oil inlet 17a positioned substantially centrally in the oil reservoir chamber 2 and an oil outlet 17b connected to the inlet port of the oil pump 15. Oil 18 in the oil reservoir chamber 2 is drawn from the inlet 17a of the oil strainer 17 by the pump 15, and fed under pressure by the pump 15 to various parts in the cylinder block 1 which are to be lubricated.

Between the crankshaft 6 and an upper oil level 18a in the oil reservoir chamber 2, there is disposed a volume body 19 having a predetermined volume in the space between the crankshaft 6 and the upper oil level 18a, the volume body 19 being fastened to the lower end of a skirt 1b of the cylinder block 1 by at least three bolts 20. The volume body 19 is of a hollow construction as shaped in FIGS. 1 and 2, and may be formed by forming two thin sheets of iron and joining their peripheral edges to each other. The volume body 19 has a flat lower panel $19_1$ spaced a prescribed dimension upwardly from the oil level 18a, and an upper panel $19_2$ lying below and radially outwardly, by a prescribed dimension, of a crank locus (i.e., the path along which the outer edges of the crank arms 6c rotate) indicated by the two-dot-and-dash lines in FIG. 1, the upper panel $19_2$ being concave downwardly along the crank locus. The lower panel $19_1$ has an oil entry hole $19_{10}$ for admitting the oil 18 into the volume body 19 when an excess of oil 18 is supplied to the oil reservoir chamber 2 above the upper oil level 18a. The upper panel $19_2$ has an oil return hole $19_2$ for returning oil which has lubricated the parts and dropped from the cylinder block 1, back into the oil reservoir chamber 2.

As illustrated in FIG. 2, the volume body 19 has a through hole 19a defined centrally therein with a bracket 21 that is fixed at its lower end to the oil strainer 17 being inserted through the hole 19a. The bracket 21 has an upper end fastened to the bearing cap 9 by means of a bolt 22.

The volume body 19 doubles as a baffle plate disposed outwardly of the crank locus and covering substantially the entire surface of the oil level 18a. Therefore, the volume body 19 prevents the oil level 18a from being disturbed, stirred or splashed during high-speed rotation of the crank arms 6c of the crankshaft 6.

When the motor vehicle is running at a constant speed on a level road, the oil level 18a of the oil 18 in the oil reservoir chamber is horizontal. The oil 18 is drawn from the inlet 17a of the oil strainer 17 by the pump 15, and fed under pressure to the various parts in the cylinder block 1 by the pump 15.

When the motor vehicle makes a turn or is accelerated or decelerated or is on severely banked or inclined road (depending on which direction the engine crankshaft 6 is oriented with respect to the automobile), the oil 18 is displaced to one side in FIG. 1 dependent on the direction of the turn or the acceleration or deceleration or the road bank or incline, thus changing the oil level from the horizontal oil level 18a to a tilted oil level 18a'. At this time, a portion of the volume body 19 is submerged below the oil level, and the oil level is raised by a height which is commensurate with the volume (indicated by a shaded portion A in FIG. 1) of the submerged portion of the volume body 19 below the oil level, with the result that the oil level at the inlet 17a of the oil strainer 17 is also raised. If it were not for the volume body 19, the oil level would lie at 18a" as indicated by the two-dot-and-dash line in FIG. 1, and the oil would be below the oil strainer inlet 17a thereby allowing air to be drawn through the inlet 17a rather than oil. With the volume body 19 disposed, however, the oil level is kept at the oil level 18a' which is higher than the oil level 18a" by the volume of the portion of the volume body 19 submerged below the oil level. Similarly, if the engine is tilted from the horizontal, as viewed in FIG. 2, the volume body 19 serves to maintain a sufficiently high oil level 18a to cover the oil strainer inlet 17a.

When the motor vehicle runs again at a constant speed and on a reasonably level road, the oil level returns from the tilted oil level 18a' to the flat oil level 18a.

When the oil level is thus raised at the oil strainer inlet 17a, no air is drawn from the inlet 17a but sufficient oil is drawn from the inlet 17a and supplied to the various parts of the engine which are to be lubricated While the volume body 19 is shown as being fixed to the skirt 1b of the cylinder block 1 in the above embodiment, the volume body 19 may be fixed to the bearing cap 9 for the crankshaft 6 or the oil reservoir chamber 2.

Figure 3:
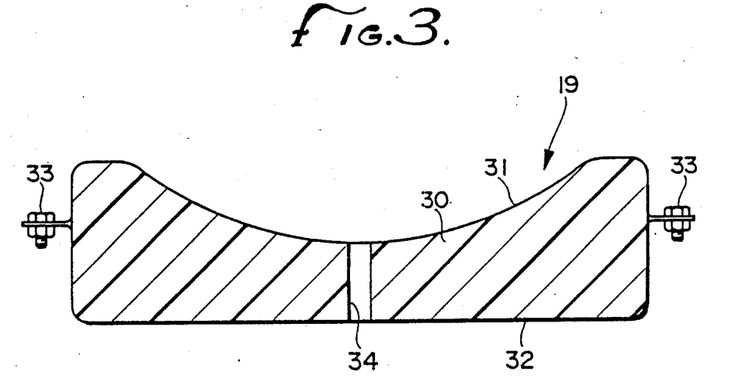
FIG. 3 is a cross-sectional view showing a modification of the first embodiment of the present invention.
Figure 4:
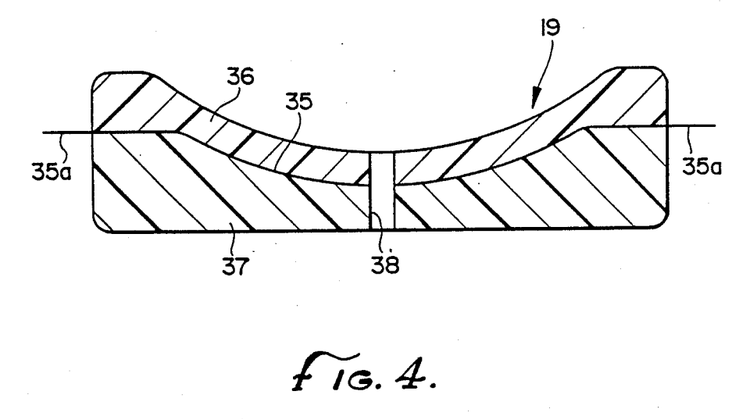
FIG. 4 is a cross-sectional view showing another modification of the first embodiment of the present invention.

FIG. 3 shows a modification of this first embodiment according to the present invention. According to this modification, the volume body 19 is of a solid construction. More specifically, the volume body 19 comprises a mass 30 of foamed styrene covered entirely with two aluminum panels 31, 32. The aluminum panels 31, 32 have opposite ends fastened to the lower end of the skirt 1b by at least three bolts 33. The volume body 19 has an oil return hole 34 similar to the oil return hole $19_{20}$ FIG. 4 illustrates another modification of this first embodiment of the present invention. According to this modification, the volume body 19 is of a solid construction comprising an aluminum panel 35 sandwiched between masses 36, 37 of foamed styrene. The aluminum panel 35 has opposite ends 35a projecting from opposite sides of the foamed styrene masses 36, 37 and fastened to the lower end of the skirt 1b by at least there bolts. The volume body 19 has an oil return hole 38 similar to the oil return hole $19_{20}$.

The oil reservoir structure for an engine according to the first embodiment of the present invention, having an oil reservoir chamber attached to a lower end of a cylinder block of the engine, comprises a volume body having a predetermined volume in a space defined between a crankshaft of the engine and an oil level in the oil reservoir chamber, the volume body being fixedly disposed in the oil reservoir chamber. When oil in the oil reservoir chamber is displaced to one side while a motor vehicle incorporating the oil reservoir structure is making a turn or being accelerated or decelerated or is on a banked or inclined road, a portion of the volume body is submerged below the oil level. The oil level is increased by a height that is commensurate with the volume of the submerged portion of the volume body below the oil level, and hence the oil level at the inlet of an oil strainer is also increased. Therefore, the oil level can sufficiently be raised even when the oil level is greatly tilted owing to the turn or acceleration or deceleration of the motor vehicle, so that the oil level at the inlet of the oil strainer can reliably be prevented from being lowered. The parts of the engine which are to be lubricated can therefore be reliably lubricated by a minimum amount of oil required irrespective of operating conditions of the engine. Because the total amount of oil used is small, the weight of the engine may be reduced and the running cost required to replace the oil may also be reduced. Since the volume body is simply fixedly mounted in the oil reservoir chamber, the oil reservoir structure can be manufactured simply and for a low cost.

The volume body also doubles as a baffle plate disposed outwardly of the path of rotation of the crankshaft and covers substantially the entire oil surface in the oil reservoir chamber. Therefore, the number of components used for the oil reservoir structure is reduced, the oil reservoir structure is manufactured simply and at a low cost, and is lightweight.

Figure 5:
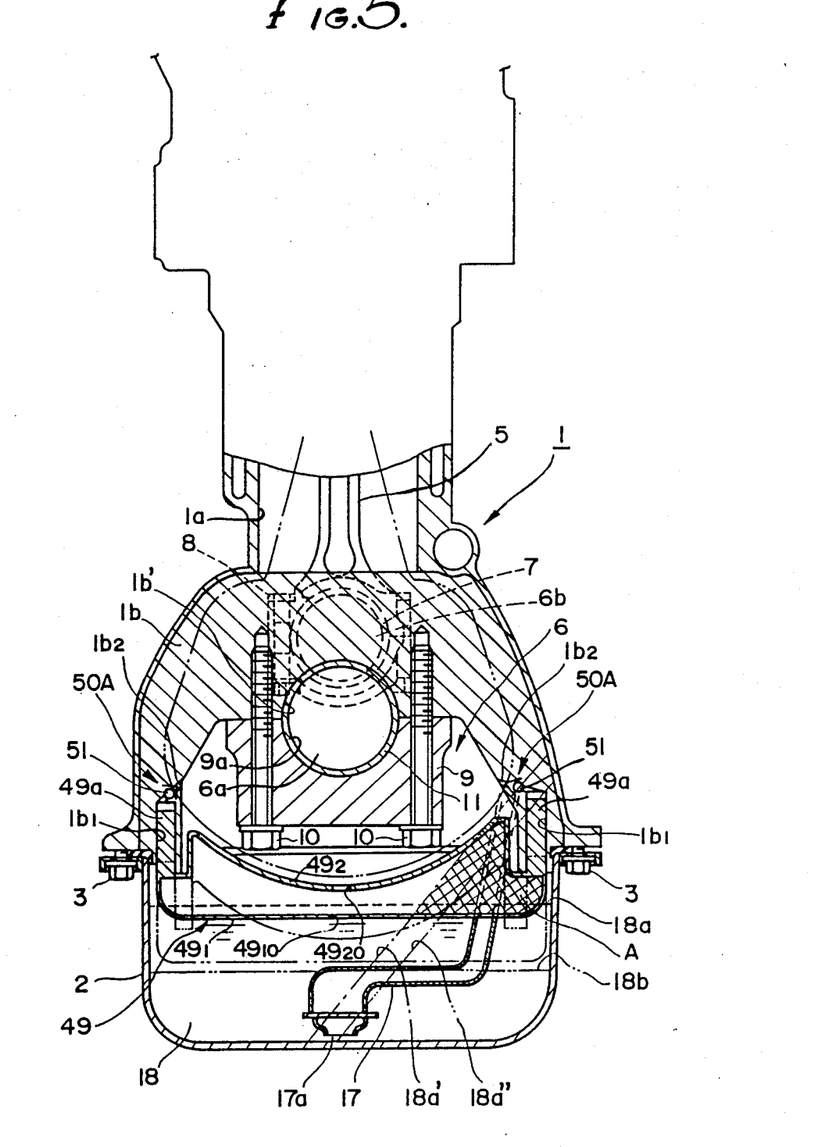
FIG. 5 is a vertical cross-sectional end view of an oil reservoir chamber in an engine for a motor vehicle, taken along a plane perpendicular to the axis of a crankshaft, showing a second embodiment of the present invention.
Figure 6:
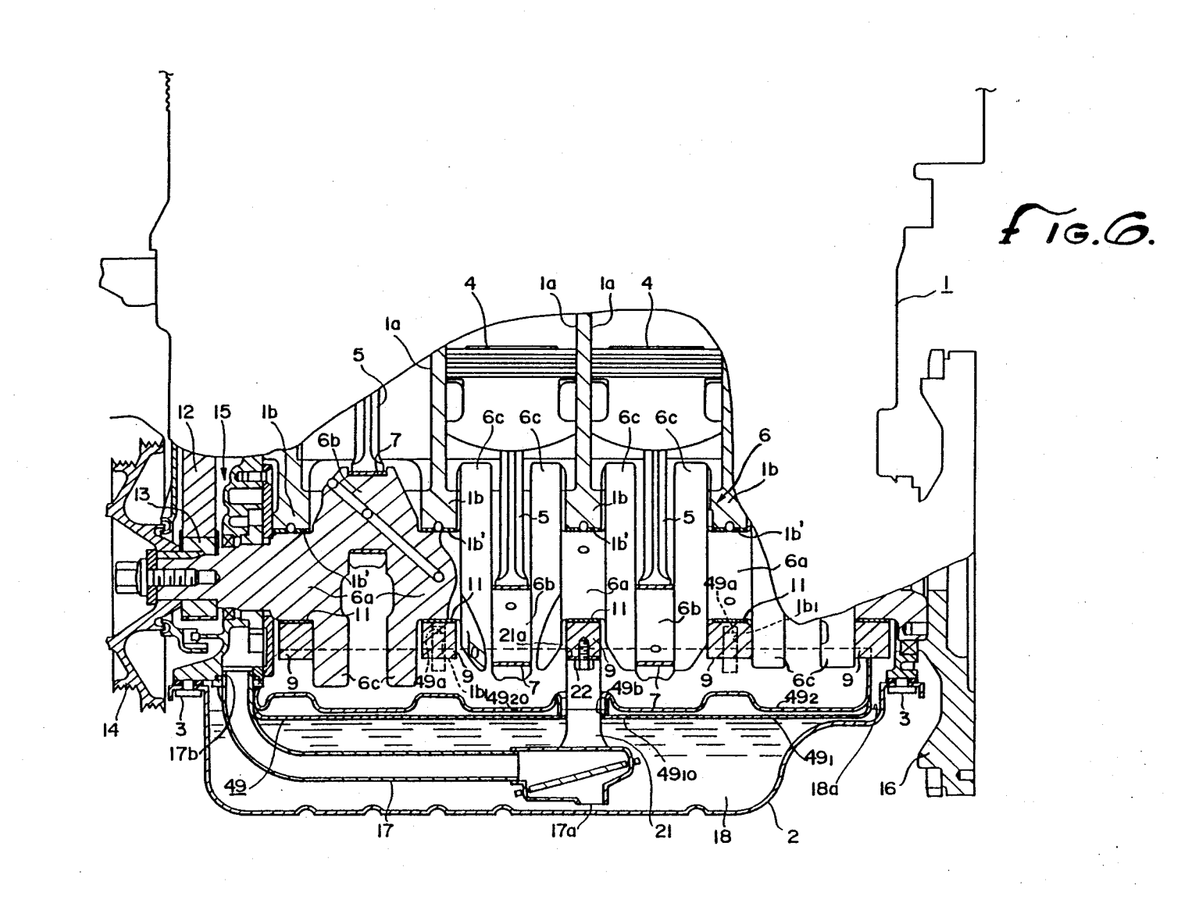
FIG. 6 is a vertical cross-sectional side view of the oil reservoir chamber of FIG. 5 taken along a plane including the axis of the crankshaft.

FIGS. 5 and 6 show a second embodiment in which the present invention is applied to an oil reservoir chamber for a four-cylinder engine. The portions and elements of this second embodiment that are the same as the first embodiment are identified by the same numerals and will not be described in detail again. This second embodiment is also provided with a volume body, generally designated 49, similar to volume body 19 of the first embodiment but volume body 49 is movable.

An oil strainer 17 is disposed in the oil reservoir chamber 2. The oil strainer 17 has an oil inlet 17a positioned substantially centrally in the oil reservoir chamber 2 and an oil outlet 17b connected to the inlet port of the oil pump 15. Oil 18 in the oil reservoir chamber 2 is drawn from the inlet 17a of the oil strainer 17 by the pump 15.

The oil 18 in the oil reservoir chamber 2 has an upper oil level 18a on which the volume body 49 floats and the volume body 49 has a volume lying substantially fully in the space between the crankshaft 6 and the upper oil level 18a. The volume body 49 has at least three rods 49a slidably fitted respectively in vertical holes $1b_1$ defined in the lower end of the skirt 1b of the cylinder block 1. The volume body 49 is therefore vertically movable in response to changes in the upper oil level 18a.

A damper mechanism 50A is provided as a means for limiting upward movement of the volume body 49 by lowering the speed of upward movement thereof. The damper mechanism 50A is in the form of an air damper and comprises the rods 49a the vertical holes $1b_1$ communication passages $1b_2$ communicating with the respective vertical holes $1b_1$ and opening into the space in the cylinder block 1, and check valves 51 disposed respectively in the communication passages $1b_2$. When a motor vehicle incorporating the present invention makes a turn or is accelerated or decelerated or is on a severely banked or inclined road, the oil 18 is displaced to one side thereby to change the oil level from the horizontal oil level 18a to a tilted oil level 18a', thus moving the volume body 49 upwardly. when the volume body 49 is moved upwardly, air in the vertical holes $1b_1$ is compressed to dampen the volume member 49 for limiting the speed of the upward movement thereof. When the volume body 49 is moved downwardly upon the oil level changing from the tilted oil level 18a' back to the horizontal oil level 18a, air is admitted into the vertical holes $1b_1$ through the check valves 51. Therefore, the volume body 49 is allowed to descend quickly with the change in the oil level.

The volume body 49 is in the form of a hollow member shaped as shown in FIGS. 5 and 6, and may be formed of two thin sheets of iron with their peripheral edges bonded to each other. The volume body 49 has a flat lower panel $49_1$ and an upper panel $49_2$ lying below and radially outwardly, by a prescribed dimension, of a crank locus (i.e., the path along which the outer edges of the crank arms 6c rotate); indicated by the two-dot-and-dash lines in FIG. 5, the upper panel $49_2$ being concave downwardly along the crank locus.

The lower panel $49_1$ has an oil entry hole $49_{10}$ for admitting the oil 18 into the volume body 49. The upper panel $49_2$ has an oil return hole $49_{20}$ for returning oil which has lubricated the parts and dropped from the cylinder block 1, back into the oil reservoir chamber 2. As illustrated in FIG. 6, the volume body 49 has a through hole 49b defined centrally therein with a bracket 21 that is fixed at its lower end to the oil strainer 17 being inserted through the hole 49b. The bracket 21 has an upper end 21a fastened to the bearing cap 9 by means of a bolt 22.

A lower stopper (not shown) is provided for stopping the volume body 49 at a lower level indicated by the two-dot-and-dash lines in FIG. 5 even when the oil level of the oil 18 is lowered below a lower oil level 18b. The lower stopper thus prevents the volume body 19 from hitting the oil strainer 17.

Operation of the oil reservoir structure of this second embodiment will be described. When the motor vehicle is running at a constant speed, the oil level of the oil 18 in the oil reservoir chamber is kept as the horizontal oil level 18a. The oil 18 is drawn from the inlet 17a of the oil strainer 17 by the pump 15, and fed under pressure to the various parts in the cylinder block 1 by the pump 15.

When the motor vehicle makes a turn or is accelerated or decelerated or is on a severely banked or inclined road, the oil 18 is displaced to one side in FIG. 5 dependent on the direction of the turn, acceleration, deceleration, bank or incline, thus changing the oil level from the horizontal oil level 18a to the tilted oil level 18a'. At this time, the volume body 49 tends to rise due to its buoyancy. Since, however, the volume body 49 is subjected to damping forces from the damper mechanism 50A, the speed of upward movement of the volume body 49 is limited by the damper mechanism 50A, i.e., the volume body 49 is moved upwardly slowly with a delay from the change in the oil level. Therefore, a portion (indicated by a shaded area A in FIG. 5) of the volume body 49 is submerged below the oil level, and the oil level is raised by a height which is commensurate with the volume of the shaded portion A below the oil level, with the result that the oil level at the inlet 17a of the oil strainer 17 is also raised. The oil at the oil strainer inlet 17a is thus deepened, and a sufficient amount of oil 18 can then be drawn from the oil strainer inlet 17a and supplied to the various parts of the engine without admitting any air. If it were not for the volume body 49, the oil level would lie at 18a'' as indicated by the two-dot-and-dash line in FIG. 5, and the oil at the oil strainer inlet 17a would be exposed and allow air to be admitted from the inlet 17a.

When the motor vehicle runs again at a constant speed, the oil level returns from the tilted oil level 18a' to the flat oil level 18a, and the volume body 49 is lowered. At this time, because air flows through the check valves 51 into the vertical holes 1b, of the damper mechanism 50A, the volume body 49 is quickly lowered with the change in the oil level.

While the volume body 49 is shown in FIGS. 5 and 6 as being of a hollow construction, the volume body 49 may be of a solid construction made of a lightweight resin such as foamed styrene. Alternatively, the volume body 49 may be in the form of a hollow member made of such a resin.

A modified form of this second embodiment of the present invention will be described with reference to FIG. 7. An upper stopper 50B is provided, rather than the damper mechanism 50A, as a means for limiting upward movement of the volume body 49. The upper stopper 50B comprises a pair of fingers 49c fixed respectively to opposite side walls of the volume body 49 and a pair of upper engaging members 54 fixed to inner wall surfaces of the oil reservoir chamber 2 for engaging the respective fingers 49c when the oil level of the oil 18 is kept at the upper oil level 18a and the volume body 49 is positioned at the upper level indicated by the solid lines in FIG. 7. Another pair of lower engaging members 55 is fixed to the inner wall surfaces of the oil reservoir chamber 2 as the lower stopper (described above) for stopping the volume body 19 at the lower level.

At least three rods 56 are fixedly mounted on the lower end of the volume body 49 and loosely fitted respectively in vertical holes 57a defined in respective guide sleeves 57 fixedly mounted on the bottom of the oil reservoir chamber 2, with clearances around the rods 26 in the holes 57a being large enough to allow the oil 18 to flow sufficiently therethrough. The rods 56 loosely fitted in the vertical holes 57a permit the volume body 49 to move vertically in response to changes in the oil level of the oil 18.

Between the volume body 49 and the crankshaft 6, there is disposed a baffle plate 58 for preventing the oil level 18a from being disturbed or stirred upon high-speed rotation of the crank arms 18a of the crankshaft 6.

With this modification of the second embodiment thus arranged, when the oil level of the oil 18 in the oil reservoir chamber 2 is changed from the horizontal oil level 18a to the tilted oil level 18a' due to a turn or acceleration or deceleration of the motor vehicle, the volume body 49 is apt to rise owing to its buoyancy. However, inasmuch as the fingers 49c are engaged by the respective upper engaging members 54 of the upper stopper 50B, the volume body 49 is not moved upwardly beyond the upper level represented by the solid lines in FIG. 7. Therefore, a portion (indicated by a shaded area A in FIG. 7) of the volume body 49 is submerged below the oil level, and the oil level is then elevated by a height that is commensurate with the volume of the shaded portion A of the volume body 49 below the oil level, thereby raising the oil level at the oil strainer inlet 17a.

The upper engaging members 54 may be fixed to the inner wall surfaces of the oil reservoir chamber 2 at a position which is slightly spaced upwardly from the fingers 49b when the volume body 49 is positioned at the upper level. According to such a modification, the volume body 49 is slightly moved upwardly and then stopped when the motor vehicle makes a turn or is accelerated or decelerated.

Another modification of the first embodiment of the present invention will be described with reference to FIG. 8. An oil pressure damper mechanism 50C is provided instead of the air pressure damper mechanism 50A shown in FIG. 5. The oil pressure damper mechanism 50C includes at least three rods 58 fixed to the lower end of the volume body 49 and having respective sliders 58a on their lower ends, guide sleeves 59 having respective vertical holes 59a defined therein with the sliders 58a slidably fitted respectively therein and communication passages 59b extending laterally from the lower ends of the respective vertical holes 59a and opening into the oil reservoir chamber 2, the guide sleeves 59 being fixedly mounted on the bottom of the oil reservoir chamber 2, and check valves 60 disposed respectively in the communication passages 59b.

When the oil level of the oil 18 in the oil reservoir chamber 2 is changed from the horizontal oil level 18a to the tilted oil level 18a' due to a turn or acceleration or deceleration of the motor vehicle, the volume body 49 is apt to rise owing to its buoyancy. However, since the oil 18 flows only slightly in the direction indicated by the arrows through small clearances between the inner surfaces of the vertical holes 59a and the sliders 58a the speed of upward movement of the volume body 49 is limited as with the embodiment of FIG. 5. Therefore, a portion (indicated by a shaded area A in FIG. 8) of the volume body 49 is submerged below the oil level, and the oil level is then elevated by a height that is commensurate with the volume of the shaded portion A of the volume body 49 below the oil level, thereby raising the oil level at the oil strainer inlet 17a.

When the motor vehicle runs again at a constant speed, the oil level returns from the tilted oil level 18a' to the flat oil level 18a, allowing the volume body 49 to be lowered. At this time, because the oil 18 in the vertical holes 59a of the damper mechanism 50C is forced by the sliders 58a into the oil reservoir chamber 2 through the check valves 60, the volume body 49 is quickly lowered with the change in the oil level.

Figure 7:
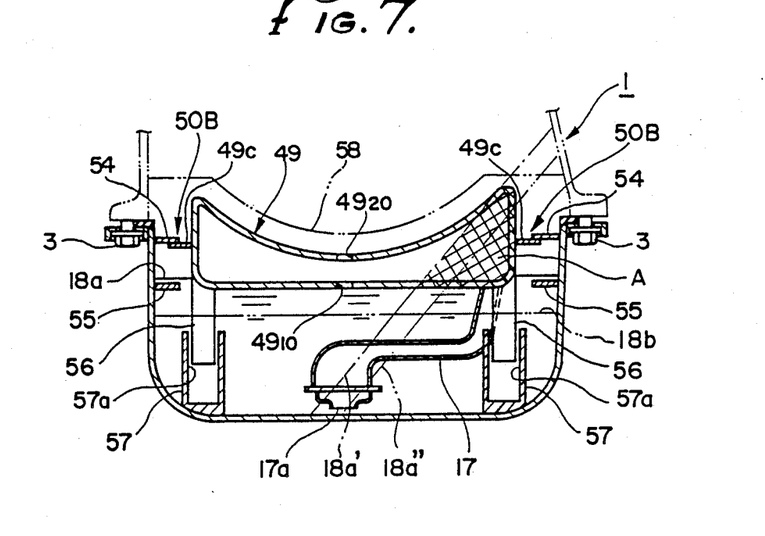
FIG. 7 is a vertical cross-sectional end view similar to FIG. 1, showing a modification of this second embodiment of the present invention.

In the modified embodiment of FIG. 7, where the upper engaging members 54 are positioned such that they are slightly spaced upwardly from the fingers 49c when the volume body 49 is positioned at the upper level, and if the oil level changes so slightly that the fingers 49c will not engage the upper engaging members 54, then the volume body 49 is moved quickly with the oil level, and the oil level is not expected to rise. According to the embodiments of FIGS. 5 and 8 which employ the damper mechanisms 50A, 50C, respectively, the speed of upward movement of the volume body 49 is limited at all times, and hence the oil level can reliably be raised even when the oil level changes only slightly.

Figure 8:
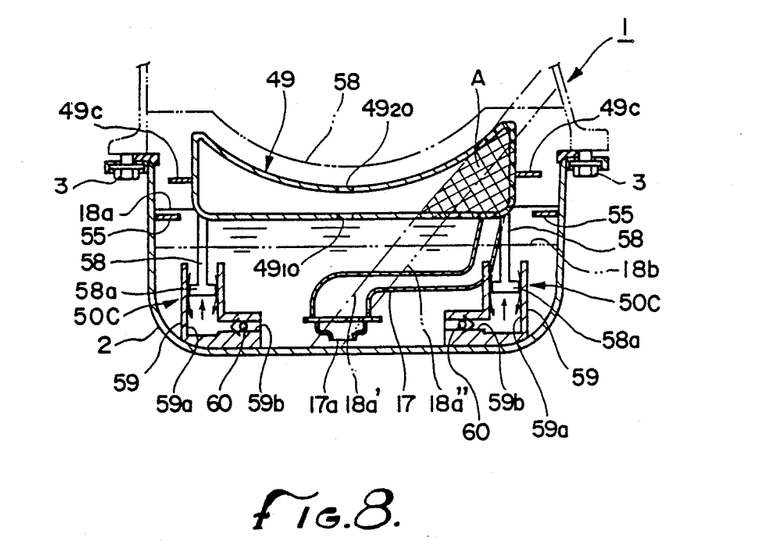
FIG. 8 is a vertical cross-sectional end view similar to FIG. 1, showing another modification of this second embodiment of the present invention.
Figure 9:
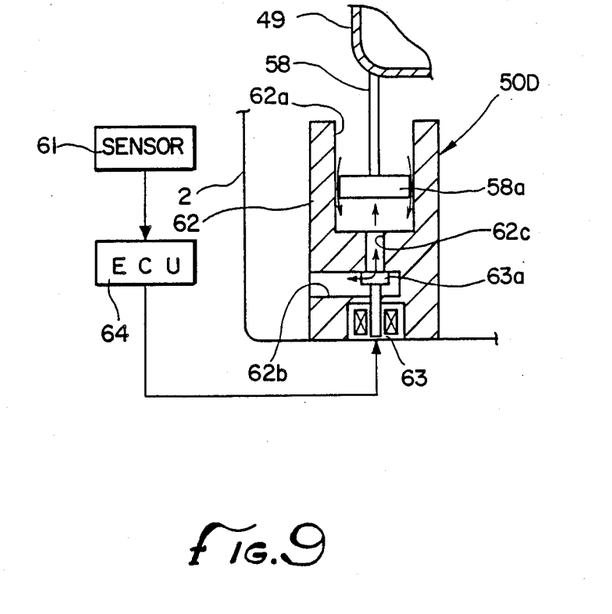
FIG. 9 is a fragmentary cross-sectional end view showing still another modification of this second embodiment of the present invention.

FIG. 9 shows still another modification of this second embodiment of the present invention. According to this modified embodiment, a means for limiting upward movement of the volume body 49 includes, rather than the damper mechanism 50C of the modified embodiment of FIG. 8, a sensor 61 for detecting a turn, acceleration, deceleration and any other relevant operating characteristics of the motor vehicle, and a damper mechanism 50D responsive to a detected signal from the sensor 61 for limiting the speed of upward movement of the volume body 49.

The damper mechanism 50D comprises a rod 58, a guide sleeve 62 fixedly mounted on the bottom of the oil reservoir chamber 2, and a normally open solenoid-operated valve 63. The guide sleeve 62 has a vertical hole 62a in which a slider 58a on the lower end of the rod 58 is slidably fitted, and a communication passage 62c communicating with the lower end of the vertical hole 62a and opening into the oil reservoir chamber 2 through a communication passage 62b. The solenoid-operated valve 63 has a valve body 63a for selectively opening and closing the lower end of the communication passage 62c.

The sensor 61 detects when the motor vehicle makes a turn or is accelerated or decelerated or other operating characteristics by detecting operation of the brake, the amount of movement of the accelerator pedal, the angle through which the steering wheel is turned, etc. The sensor 61 applies a detected signal to an electronic control unit 64. In response to the applied signal from the sensor 61, the control unit 64 applies a control signal to the solenoid-operated valve 63 to keep the valve 63 closed.

When the motor vehicle makes a turn or is accelerated or decelerated or banked or inclined, the oil 18 is displaced to one side in FIG. 1 dependent on the direction of the turn, the acceleration or deceleration or bank or incline, thus changing the oil level from the horizontal oil level 18a to the tilted oil level 18a'. At this time, the volume body 49 tends to rise due to its buoyancy. Upon detection by the sensor 61, the control unit 64 keeps the solenoid-operated valve 63 closed, i.e., enables the valve body 63a of the solenoid-operated valve 63 to close the lower end of the communication passage 62c. With the solenoid-operated valve 63 thus closed, the oil 18 flows only slightly into the vertical hole 62a in the direction of the arrows through a small clearance between the inner surface of the vertical hole 62a and the slider 58a, so that the speed of upward movement of the volume body 49 is limited. Therefore, a portion (indicated by the shaded area A) of the volume body 49 is submerged below the oil level, and the oil level is raised by a height which is commensurate with the volume of the shaded portion A below the oil level, with the result that the oil level at the inlet 17a of the oil strainer 17 is also raised.

When the motor vehicle runs again at a constant speed, the oil level returns from the tilted oil level 18a' to the flat oil level 18a and the volume body 49 is lowered. Since the valve body 63a of the solenoid-operated valve 63 now opens the lower end of the communication passage 62c, the oil 18 in the vertical hole 62a is forced by the slider 58a into the oil reservoir chamber 2 through the communication passages 62c, 62b, and the volume body 49 is quickly lowered with the change in the oil level.

In the embodiments of FIGS. 5 and 8 which employ the damper mechanisms 50A, 50C, the damper mechanisms 50A, 50C start operating after the oil level is actually changed. According to the embodiment of FIG. 9, however, the damper 50D starts to operate when a turn or acceleration or deceleration of the motor vehicle is detected by the sensor 61, i.e., before the oil level is actually changed. Consequently, the embodiment of FIG. 9 is more advantageous in that the oil level can be raised to a higher level.

The oil reservoir structure of this second embodiment according to the present invention, having an oil reservoir chamber attached to a lower end of a cylinder block of the engine, comprises a volume body having a predetermined volume in a space defined between a crankshaft of the engine and an oil level in the oil reservoir chamber, the volume body being disposed on the oil level and vertically movable in response to a change in the oil level, and with limiting means for limiting upward movement of the volume body. When oil in the oil reservoir chamber is displaced to one side while a motor vehicle incorporating the oil reservoir structure is making a turn or being accelerated or decelerated, upward movement of the volume body is limited by the limiting means, and a portion of the volume body is submerged below the oil level. The oil level is increased by a height that is commensurate with the volume of the submerged portion of the volume body below the oil level, and hence the oil level at the inlet of the oil strainer is also increased. Therefore, the oil level can be raised sufficiently even when the oil level is greatly tilted owing to the turn or acceleration or deceleration of the motor vehicle, so that the oil level at the inlet of the oil strainer can reliably be prevented from being lowered below the inlet. The parts of the engine which are to be lubricated can therefore be reliably lubricated by a minimum amount of oil required irrespective of operating conditions of the engine. Because the total amount of oil used is small, the weight of the engine may be reduced and the running cost required to replace the oil may also be reduced.

The limiting means in this second embodiment include a damper mechanism for limiting the speed of upward movement of the volume body. Since the damper mechanism limits the speed of upward movement of the volume body when the motor vehicle makes a turn or is accelerated or decelerated, the oil level is reliably raised even when the oil level is slightly tilted owing to the turn or acceleration or deceleration of the motor vehicle. The limiting means may comprise a sensor for detecting when the motor vehicle makes a turn or is accelerated or decelerated, and a damper mechanism for stopping upward movement of the volume body or limiting the speed of upward movement of the volume body in response to a detected signal from the sensor. When a turn or acceleration or deceleration of the motor vehicle is detected by the sensor, i.e., before the oil level starts being changed, the damper mechanism starts to operate. Therefore, the oil level can be increased to a higher level.

The claimed invention is:

1. An oil reservoir structure for an engine having an oil reservoir chamber attached to a lower end of a cylinder block of the engine, comprising a volume body having a predetermined volume in a space defined between a crankshaft of the engine and an oil level in the oil reservoir chamber, said volume body becoming partially submerged and displacing oil upon tilting of the oil level to raise the effective oil level.

2. An oil reservoir structure according to claim 1, wherein said volume body is fixedly disposed in the oil reservoir chamber.

3. An oil reservoir structure according to claim 1, wherein said volume body is separate from and supported within the oil reservoir chamber.

4. An oil reservoir structure according to claim 1, wherein said volume body doubles as a baffle plate disposed outwardly of a path along which said crankshaft is rotatable and covering a substantially entire oil surface in the oil reservoir chamber.

5. An oil reservoir structure according to claim 1, wherein said volume body is disposed on the oil level and vertically movable in response to a change in the oil level, and limiting means for limiting upward movement of said volume body.

6. An oil reservoir structure according to claim 1, 2, 3, 4, or 5, wherein said volume body is of a hollow construction.

7. An oil reservoir structure according to claim 1, 2, 3, 4, or 5, wherein said volume body is of a solid construction.

8. An oil reservoir structure according to claim 5, wherein said limiting means comprises a damper mechanism for limiting the speed of upward movement of said volume body.

9. An oil reservoir structure according to claim 5, wherein said limiting means comprises a sensor for detecting operating characteristics of a motor vehicle incorporating the oil reservoir structure, and a damper mechanism for either stopping upward movement of said volume body or limiting the speed of upward movement of said volume body in response to a detected signal from said sensor.

10. An oil reservoir structure according to claim 5, 8 or 9, wherein said limiting means allows rapid downward movement of said volume body.

* * * * *